United States Patent [19]

Rumbaugh

[11] Patent Number: 5,095,832
[45] Date of Patent: Mar. 17, 1992

[54] MODIFIED SEED PLANTER AND ADAPTER APPARATUS THEREFOR

[76] Inventor: Earnest Rumbaugh, Rte. 1, Morrill, Kans. 66515

[21] Appl. No.: 641,470

[22] Filed: Jan. 15, 1991

[51] Int. Cl.$^5$ .............................................. A01C 5/06
[52] U.S. Cl. .................................. 111/193; 172/538; 111/52
[58] Field of Search ............... 111/193, 190, 191, 192, 111/194, 926, 163, 166, 169, 149, 152, 52; 172/538

[56] References Cited

U.S. PATENT DOCUMENTS

| | | | |
|---|---|---|---|
| 3,055,322 | 9/1962 | Oehler et al. | 111/52 |
| 3,362,361 | 1/1968 | Morrison | 111/193 |
| 4,193,357 | 3/1980 | Freeman et al. | 111/193 |
| 4,404,918 | 9/1983 | Whalen et al. | 172/538 |
| 4,425,857 | 1/1984 | Lieuemann et al. | 111/52 |
| 4,702,323 | 10/1987 | Smit et al. | 111/52 |
| 4,762,181 | 8/1988 | Cox | 111/52 |
| 4,878,443 | 11/1989 | Gardner | 172/538 |
| 4,920,901 | 5/1990 | Pounds | 111/926 |
| 4,932,340 | 6/1990 | Benzel | 111/194 |
| 4,964,351 | 10/1990 | Elmenhurst | 111/163 |

OTHER PUBLICATIONS

International Harvestor, "1982 Planter Comparison Test Results", selected pages.
International Harvestor Brochure, "Early Riser Planters", 1983 selected pages.
Allis Chalmers, "Row-Crop Planters" Brochure, 1981, all.
Allis Chalmers, Brochure, 1979, selected pages.
International Harvestor, "Crop Production Equipment", 1981 selected pages.
Farm Industry News, Mid-Mar. 1991, "Low Cost Add-Ons Tackle High Trash", p. A8.
Allis-Chalmers Operator Manual for Model 74 Planter, p. 47.
Case I. H. sales literature, pp. 41-44, 900 Series Early Riser Planters.

*Primary Examiner*—Randolph A. Reese
*Assistant Examiner*—Spencer Warnick
*Attorney, Agent, or Firm*—Hovey, Williams, Timmons & Collins

[57] ABSTRACT

A planter as heretofore commercially available may be modified to accept a seed trench covering assembly of superior design, also commercially available, by lengthening the frame of the planter to increase the available space between the opener and the rear press wheel and by providing front and rear adapter brackets which enable the superior covering assembly to be coupled at the front to the opener and at the upper rear to the overhead frame. Different configurations of front adapter brackets are provided to accommodate variously shaped opener housings, and different configurations of rear adapter brackets are provided to accommodate variations in frame design.

7 Claims, 6 Drawing Sheets

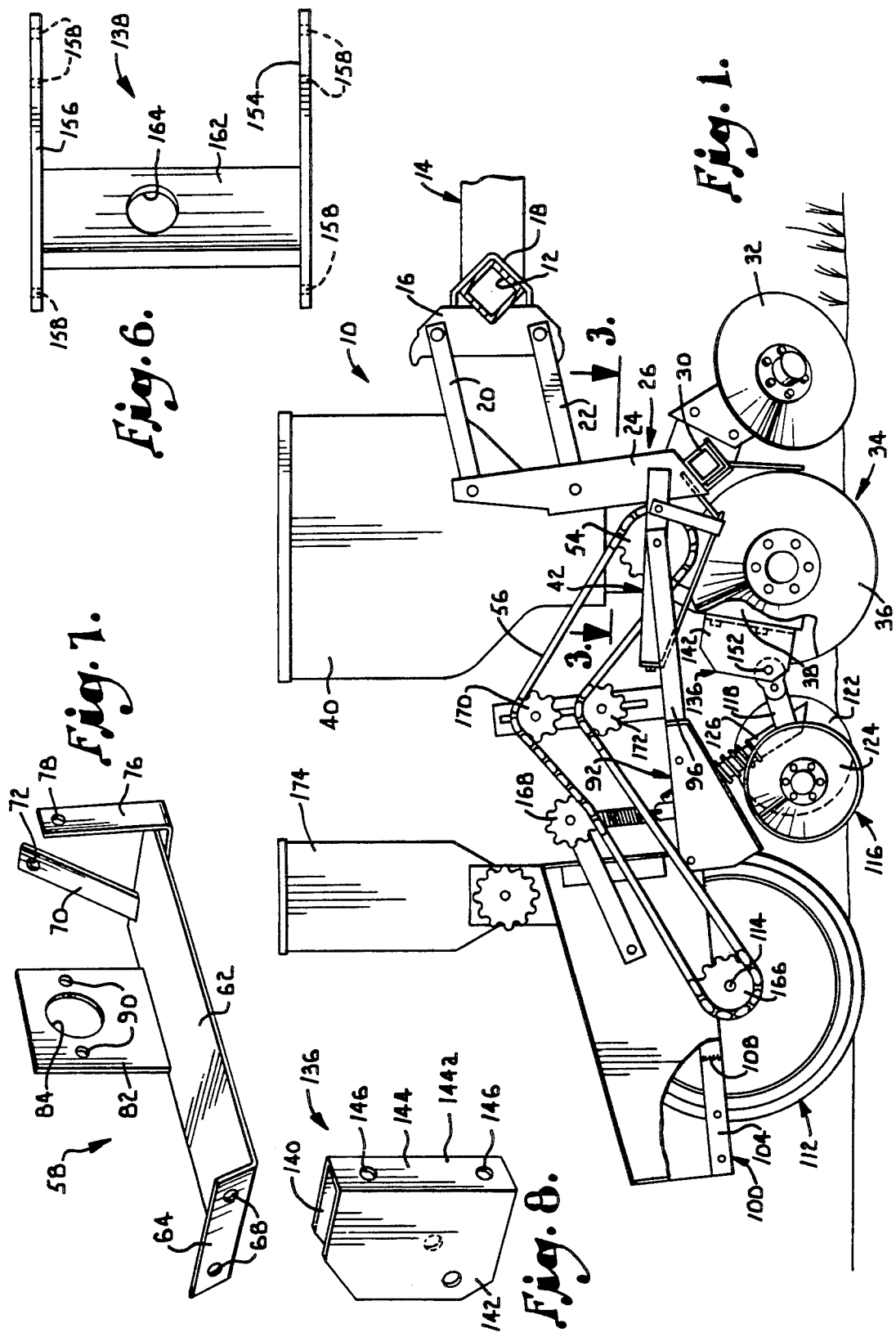

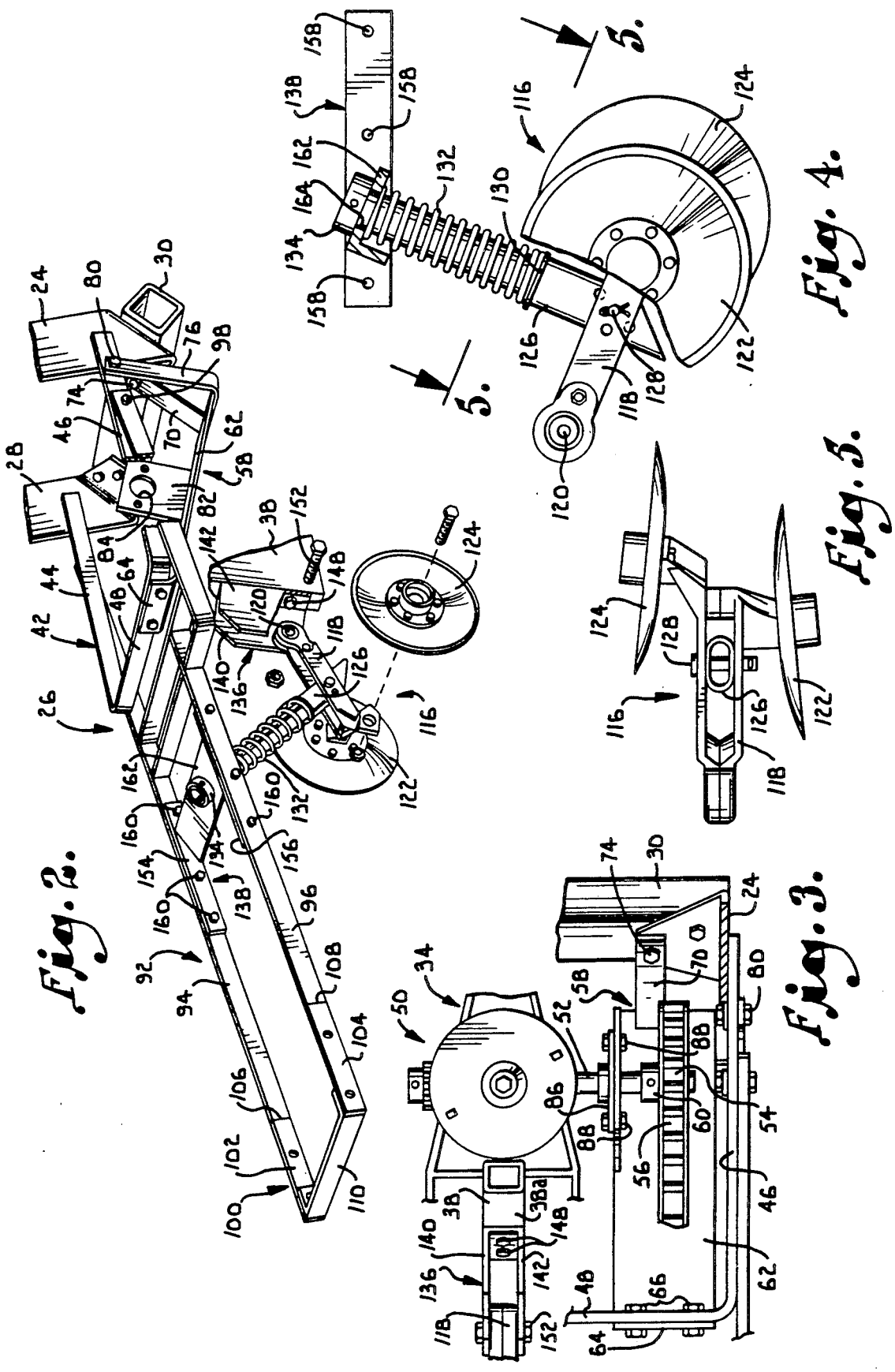

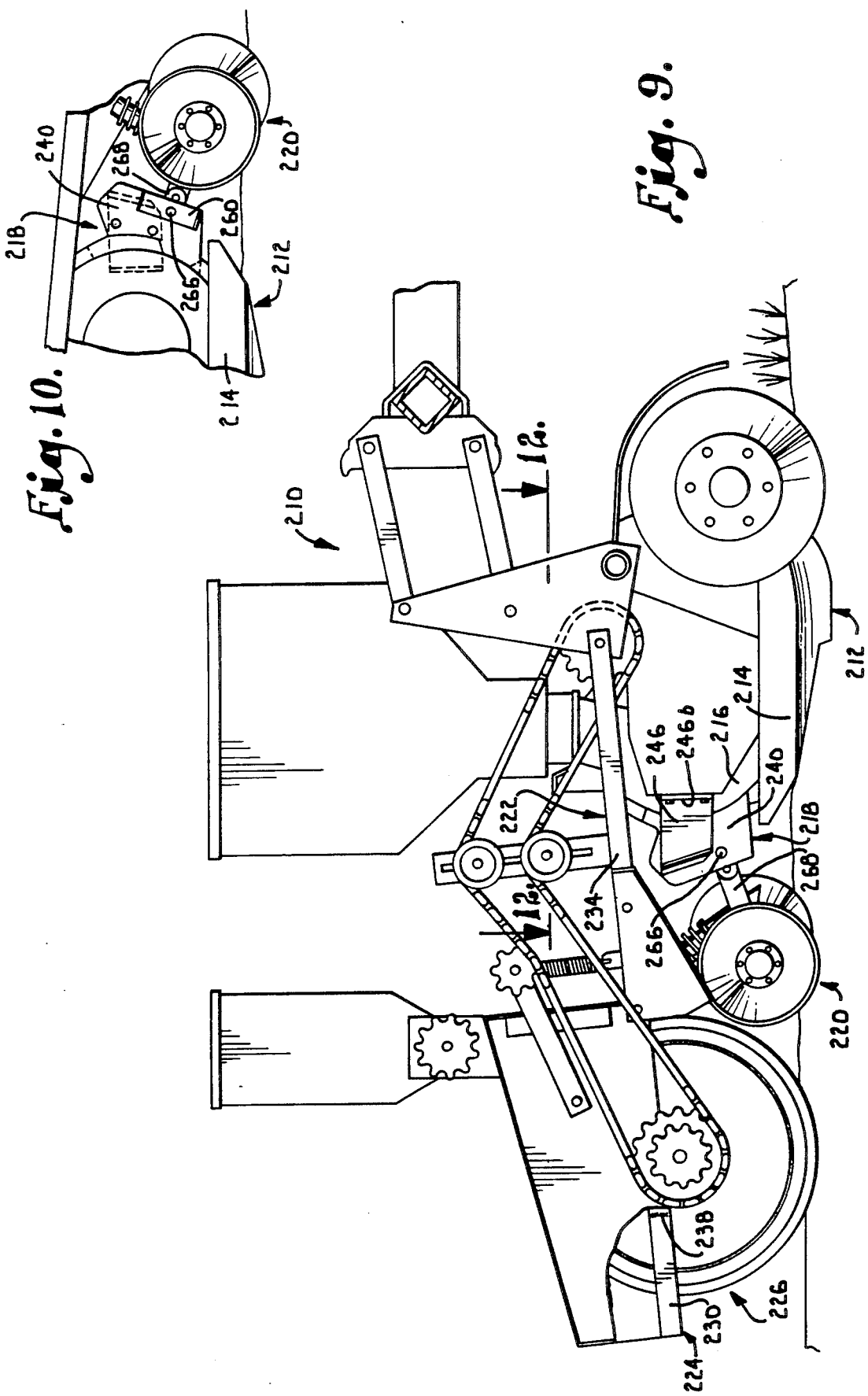

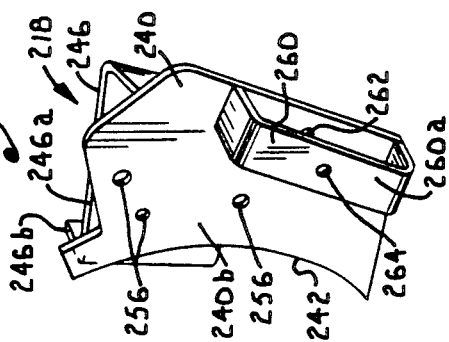
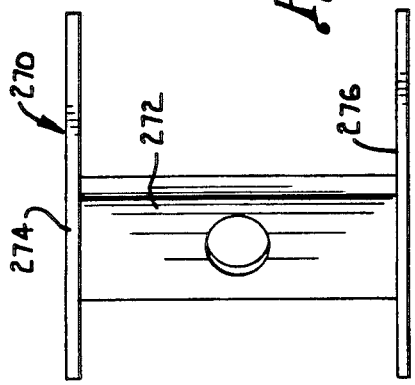
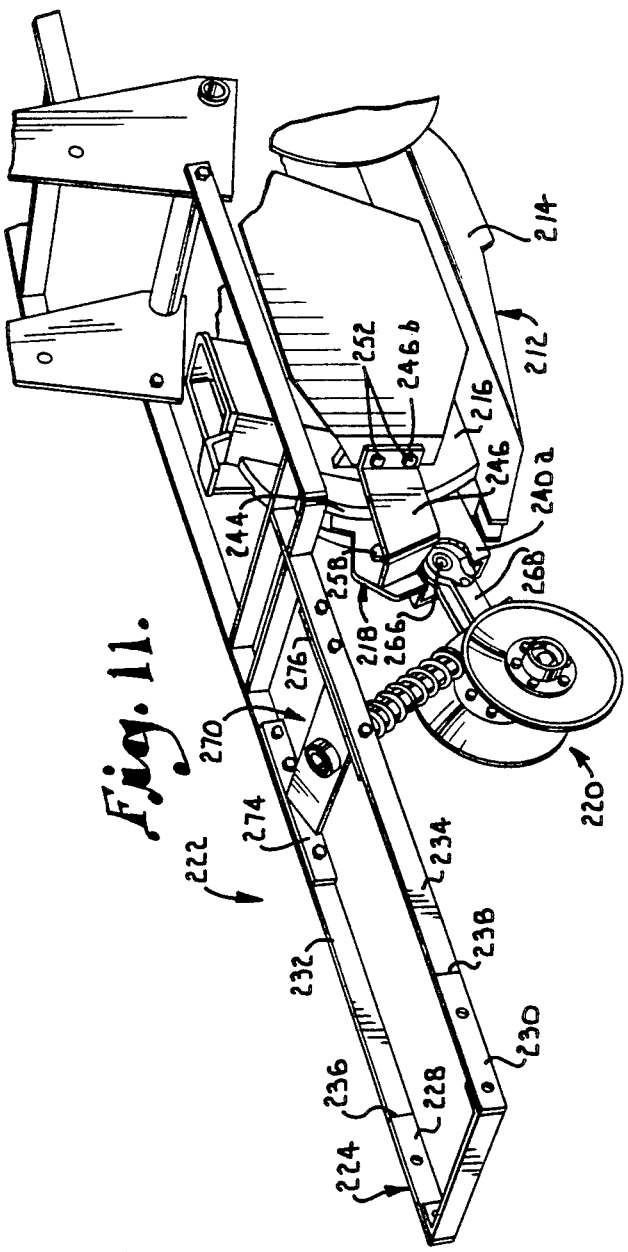
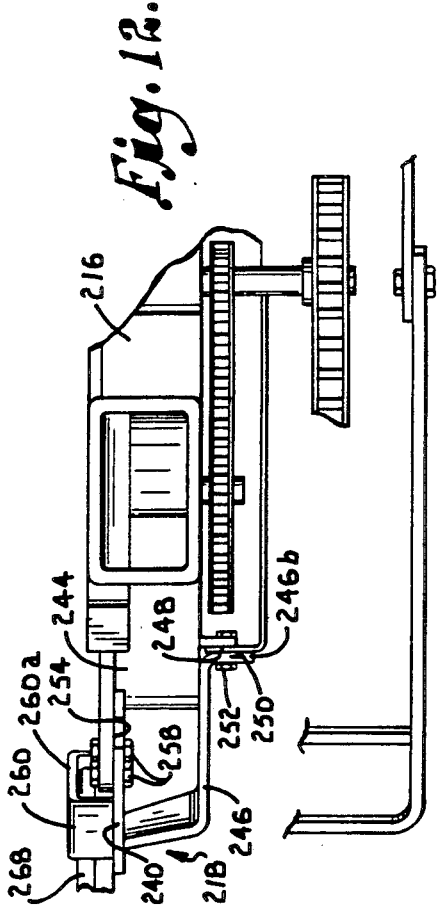

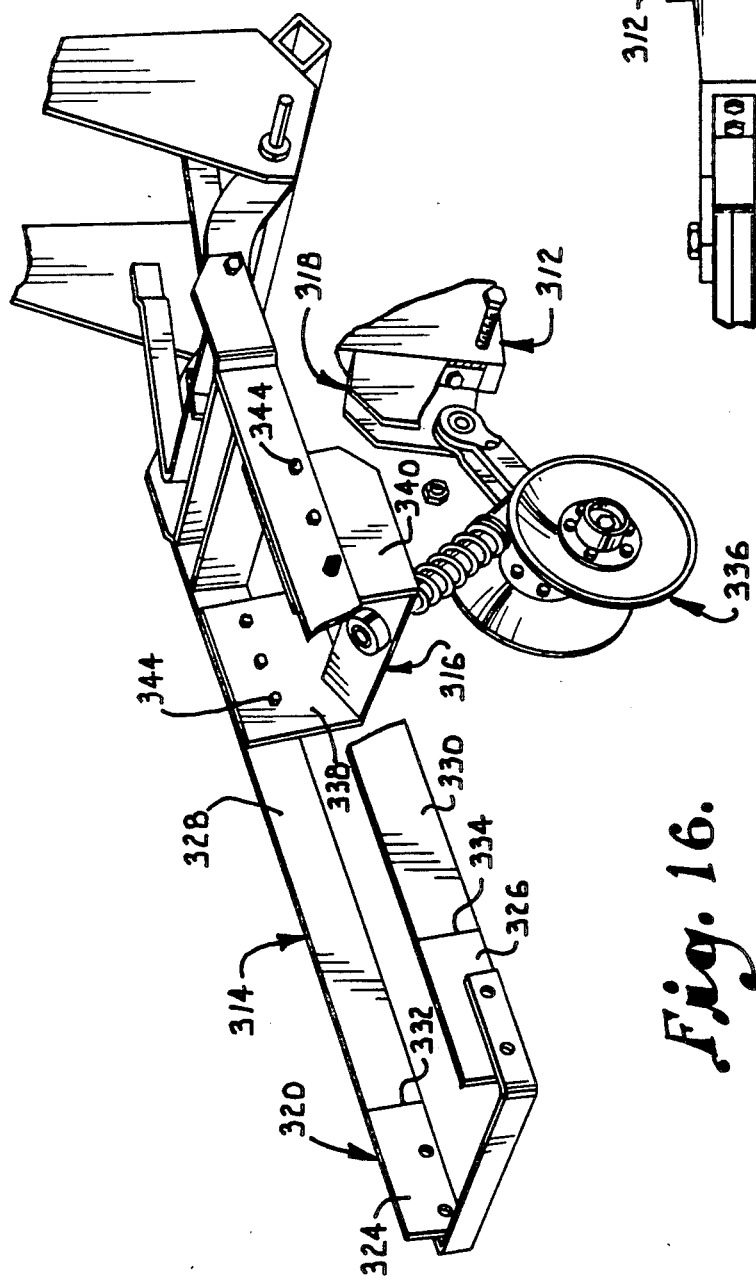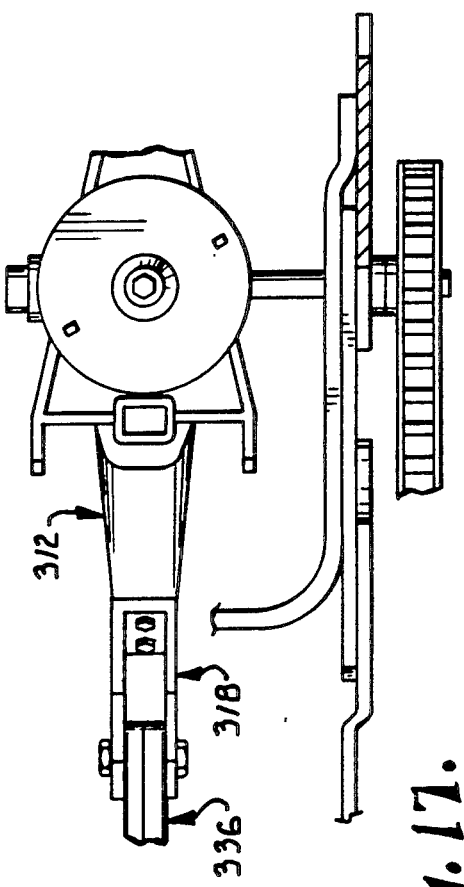

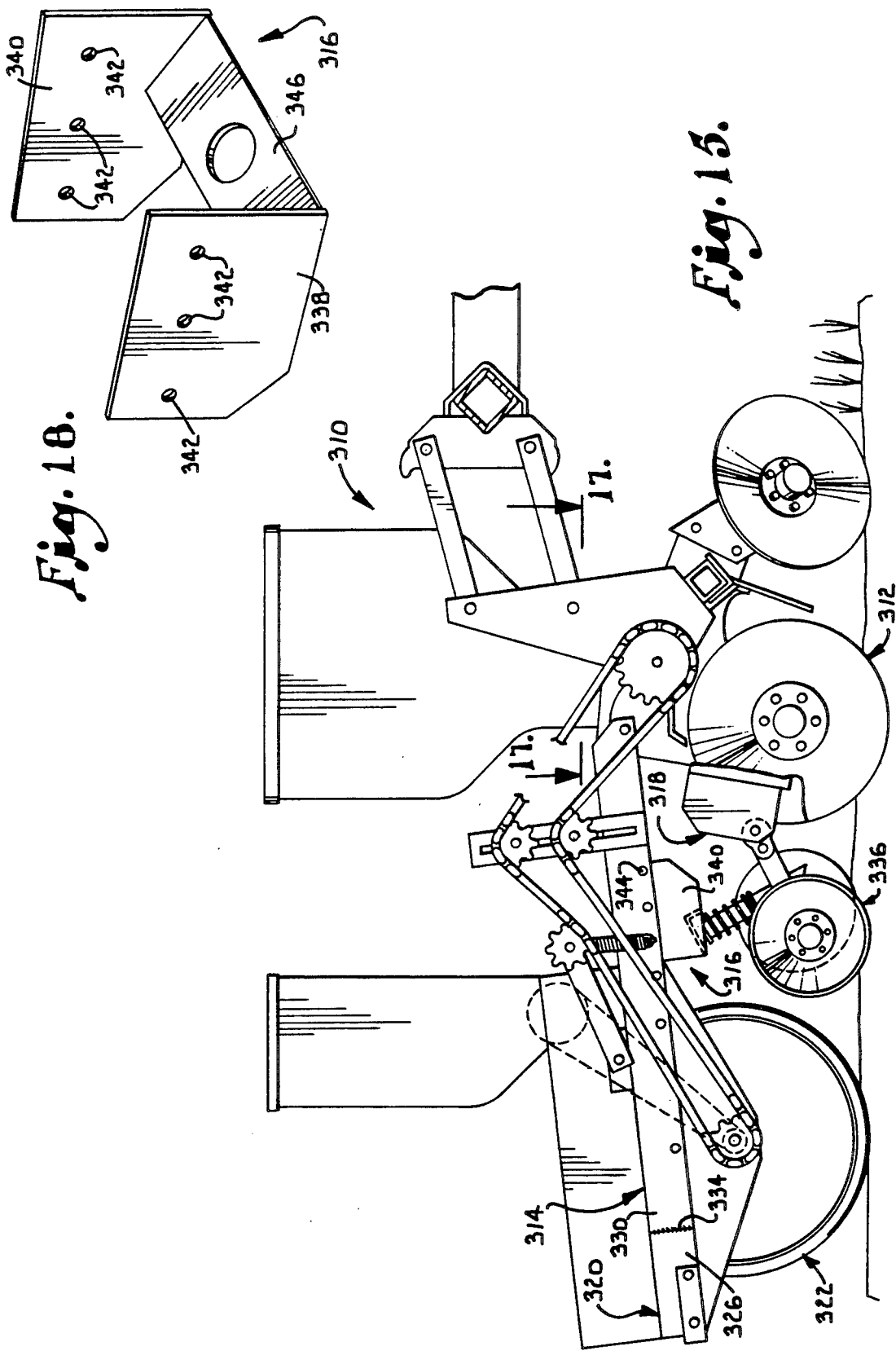

MODIFIED SEED PLANTER AND ADAPTER APPARATUS THEREFOR

TECHNICAL FIELD

This invention relates to seed planting equipment and, more particularly, to a way of modifying a presently existing planter heretofore commercially available to improve the planter particularly in the area of its covering apparatus in which soil is returned into the trench behind the opener of the planter after the deposit of seeds.

BACKGROUND

Certain presently existing planting equipment, particularly models heretofore commercialized by the Allis-Chalmers Company have utilized a type of covering apparatus that has not been totally satisfactory, particularly from the standpoint of not being able to provide uniform depth control of the deposited seeds. In the conventional construction, the covering apparatus is largely erratic in its operation and may cover some of the seeds with a substantial quantity of soil while leaving others less deeply covered, resulting in uneven planting depth and irregular emergence characteristics.

Accordingly a principle object of the present invention is to provide a way of modifying such a planter so as to provide the planter with improved covering apparatus that yields uniform depth control and thus better over all results for the framer. A further object in this respect is to provide such a modification without interfacing with the seed depositing and soil opening apparatus of the planter, which have been found to be quite acceptable for my purposes.

In carrying out the foregoing and other objects of my invention, I have chosen to completely remove the previously available covering apparatus from the equipment and to replace the same with new apparatus that operates in the desired manner. Such previous apparatus included a pair of fore-and-aft extending, long arms attached to the frame of the planter on opposite sides of the opener and provided at their rear ends with a pair of covering devices either in the form of fixed, angled soil deflecting devices or a pair of angled rotary discs that likewise deflected the soil inwardly into covering relationship with the soil trench. Each of the long arms was free to swing up and down independently of the other and was urged into a soil-engaging position solely by gravity.

In the new construction, I have installed an extension section in the fore-and-aft frame of the planter to provide a greater over all length and have therefore permitted the trailing press wheel to be reinstalled further to the rear of the planter than was heretofore the case. This provides a greater space between the opener and the trailing press wheel, permitting the insertion of a covering assembly into the enlarged space which is commercially available on the open market. I provide different styles of front adapter brackets which may be bolted directly to the rear of the existing openers so as to enable the covering assembly to be connected to such brackets. Likewise, I provide a variety of different types of rear, overhead adapter brackets which attach to the overhead frame of the particular planter being modified so as to provide a second place of attachment for certain components of the covering assembly. Such overhead bracket provides a depth limiting control for the assembly and also an overhead stop against which a compression spring can be applied to urge the soil converging discs of the assembly downwardly into soil-contacting engagement.

BRIEF DESCRIPTION OF THE DRAWINGS

FIG. 1 is a fragmentary side elevational view of one embodiment of the invention shown in connection with one model of a planter modified in accordance with the principles of the present invention;

FIG. 2 is a fragmentary right rear perspective view of the frame of the planter in FIG. 1 with parts being illustrated in an exploded condition and partially broken away to reveal details of construction;

FIG. 3 is a fragmentary horizontal cross-sectional view through the planter of FIG. 1 taken substantially along line 3—3 of FIG. 1;

FIG. 4 is an enlarged vertical cross-sectional view through the covering assembly of the opener with the front adapter bracket removed for clarity and illustrating constructional details of the top, rear adapter bracket;

FIG. 5 is a top plan view of the covering assembly of the modified planter;

FIG. 6 is a top plan view of the rear adapter bracket of the present invention;

FIG. 7 is a right rear perspective view of a bearing support bracket and chain shield forming a part of the present invention;

FIG. 8 is a right front perspective view of the front adapter bracket of the present invention;

FIG. 9 is a fragmentary side elevational view of a second planter embodiment modified in accordance with the principles of the present invention;

FIG. 10 is a fragmentary schematic elevational view of the opposite side of the planter of FIG. 9 with particular emphasis upon the front adapter bracket;

FIG. 11 is a fragmentary, right rear perspective view of the frame and opener of the planter of FIG. 9, revealing details of construction;

FIG. 12 is a fragmentary, horizontal, cross-sectional view of the planter of FIG. 9 taken substantially along line 12—12 of FIG. 9;

FIG. 13 is a left rear perspective view of the front adapter bracket of the second embodiment of the invention;

FIG. 14 is a top plan view of the rear adapter bracket for the planter of FIG. 9;

FIG. 15 is a fragmentary, right side elevational view of a third embodiment of a third planter embodiment modified in accordance with the principles of the present invention;

FIG. 16 is a right rear perspective view of the frame of the planter in FIG. 15;

FIG. 17 is a fragmentary, horizontal cross-sectional view of the planter of FIG. 15 taken substantially along line 17—17 of FIG. 15; and FIG. 18 is a left rear perspective view of the rear adapter bracket for use in connection with the planter of FIG. 15.

DETAILED DESCRIPTION

Referring initially to the embodiment of FIGS. 1-8, a planter 10 is mounted on a transverse tool bar 12 forming a part of an implement broadly denoted by the numeral 14. The planter 10 has an upright mounting bracket 16 provided with a U-bolt 18 that is looped around the tool bar 12 for attachment purposes. A pair of upper and lower, pivotal, parallel links 20 and 22 project rearwardly from the mounting bracket 16 and are pivotally coupled at the rear with one upright 24 associated with the generally fore-and-aft extending frame 26 of the planter 10. It is to be understood that the second upright 28 of the frame 26 as illustrated in FIG. 2 is likewise provided with a pair of parallel links, a mounting bracket and a U-bolt for attachment to the tool bar 12, although such structures are not illustrated in the drawings.

The frame 26 is also provided with a transverse square tube 30 that interconnects the uprights 24 and 28 beneath the latter. Although not illustrated in detail in the drawings, it is to be understood that the square tube 30 forms a part of mounting means for a soil covering apparatus that is being replaced in accordance with the present invention, such mounting means further typically including a depending bracket affixed to opposite ends of the cross tube 30 and means for pivotally retaining a pair of fore-and-aft extending rods or arms on opposite sides of the planter, each of which has a covering device of the blade or rotatable disc type at its rear end. In order to provide a full understanding of such prior construction and to assist in a clear understanding of the present invention, page 47 from an Allis-Chalmers operator manual relating to the Model 74 planter is hereby incorporated by reference into the present application, a copy of said page 47 being filed concurrently herewith.

In the illustrated embodiment of FIGS. 1–8, the planter 10 includes a pair of trash-clearing discs 32 supported by the frame 26 in leading relationship to the cross tube 30 and centrally thereof to initially clear residue from the surface of the soil as the planter is advanced. Rearwardly behind the trash-clearing discs 32 and supported by the frame 26 is an opener broadly denoted by the numeral 34 for forming a trench in the cleared soil and for depositing seeds seriatim in such trench as the planter is advanced. In the form illustrated in FIG. 1, the opener includes a pair of cooperating, side-by-side discs 36 which converge downwardly toward one another at their lower extremities and are spaced apart slightly at that location so as to provide pass-through clearance for seeds gravitating from a housing 38 associated with the opener 34. Above the housing 38 and likewise supported by the frame 26 is a seed box 40 which functions as a hopper within which seeds are initially dumped and then gravitationally discharged into the housing 38 where they are metered one-at-a-time into the space between the two discs 36.

The frame 26 also includes a generally U-shaped front portion 42 as perhaps shown best in FIG. 2, such front portion including a pair of fore-and-aft extending legs 44 and 46 and a rear transverse bight 48 that integrally interconnects the legs 44 and 46. The legs 44 and 46 are fixedly secured as by welding at their front ends to the respective uprights 28 and 24 above the transverse square tube 30. The housing 38 of opener 34 is disposed within the open area defined by the U-shaped front frame portion 42, projecting upwardly for communication with the seed box 40 and downwardly for cooperation with the discs 36.

As illustrated in FIG. 3, the opener 34 includes a right angle gear assembly broadly denoted by the numeral 50 which is used to receive driving input power delivered horizontally and to change the direction of such input drive to a vertical direction so as to provide driving power for metering mechanism (not shown) within the housing 38 of the opener 34. A transverse shaft 52 leading horizontally into the gear assembly 50 has a sprocket 54 at its outer end which is driven by a fore-and-aft extending chain 56 looped about the sprocket 54 and applying a rearwardly directed loading force thereto. In the previously available commercial construction prior to my present invention, the shaft 52 was supported only by the gear assembly 50 such that the chain 56 applied a considerable loading to the shaft 52 at its outer end, resulting in premature mechanical failure.

However, in accordance with one aspect of the present invention, I provide a special support bracket 58 shown most clearly in FIGS. 3 and 7 which eliminates the loading problem heretofore experienced and also provides a shield for the sprocket 54 which has a bearing 60 integrally associated therewith.

As illustrated in FIGS. 3 and 7, the support bracket 58 includes a main fore-and-aft extending, rigid shield 62 of generally plate-like construction, having an upturned rear tang 64 secured to the rear extremity of the rear bight 48 of front frame portion 42 by bolt assemblies 66 passing through openings 68 in tang 64. The shield 62 is slung under the sprocket 54 and chain 56 as illustrated in FIG. 3 and is supported at its front end by an upwardly and forwardly inclined attaching strap 70 having an opening 72 at its upper end which receives a threaded fastener 74 to secure the same to the rear face of the cross tube 30. A second strap 76 of generally L-shaped configuration juts outwardly from the side of the shield 62 adjacent the front end thereof and thence upwardly and is provided with an opening 78 at its upper end which receives a threaded fastener 80 securing the same to the outside forward portion of the frame leg 46.

The support bracket 58 further includes an upright ear 82 rigid to the shield 62 along the left side of the latter as illustrated in FIG. 7, such ear 82 having a hole 84 therein which receives a bearing assembly 86 fixed to the ear 82 via threaded fasteners 88 passing through openings 90 in the ear 82. The bearing assembly 86 journals the shaft 52 at an inwardly spaced location from the sprocket 54 and chain 56 such that the bracket 58 provides an additional rigidifying and support means for the shaft 52, absorbing significant loading of the chain 56.

The frame 26 also includes a rear portion 92 that includes a pair of laterally spaced, fore-and-aft extending opposite side members 94 and 96 that are secured at their forwardmost ends to the front frame portion 42 via bolts 98. In accordance with the principles of the present invention, the rear frame portion 92 has been extended by the addition of an extension section 100 to the rear end of the frame portion 92. In order to accomplish such lengthening of the frame, the extension section 100 includes a pair of side bars 102 and 104, respectively, having the same cross-sectional configuration as the side members 94 and 96 and welded to the rear ends of the latter at weld beads 106 and 108. The side bars 102 and 104 are of course arranged in axial alignment with their respective side members 94 and 96. A transverse, generally U-shaped end strap 110 forms a bight between the side bars 102, 104, interconnecting the same at their rearmost extremities. The frame 26 supports a press wheel 112 having a transverse axle 114 carried by the rear frame portion 92. It is to be understood that by providing the extension section 100 on the frame 26, the axle 114 of the press wheel 112 may be positioned farther to the rear than in the original factory construction, without the press wheel 112 engaging the end strap 110. Consequently, a greater distance is created between the rear of the opener 34 and the front of the press wheel than previously in existence, allowing the insertion into such space of an improved, presently commercially available covering assembly 116. Whereas in the previous factory constructed planter the covering devices were largely located outside of the path of travel of the opener 34 creating a substantial distance through which soil needed to be moved in order to cover the trench within which the seeds were deposited, in the present invention the increased space between the opener 34 and the press wheel 112 permits the covering assembly 116 to be directly in line and behind the opener 34 to engage the soil only a short distance laterally outward from the trench and to move such soil into covering relationship with the deposited seeds.

As will be seen the covering assembly 116 is the same in all three embodiments of my invention; however, the means for mounting the covering assembly 116 in place between the opener and the press wheel of the particular planter under consideration varies somewhat from planter to planter. Inasmuch as the covering assembly 116 is presently commercially available, the assembly 116 will only be briefly described hereinafter. Preferably, the covering assembly 116 comprises the covering assembly made available by the J. I. Case Company of Racine, Wis., in connection with its 900 series planters.

As illustrated particular in FIGS. 2, 4, and 5, the covering assembly 116 includes a generally fore-and-aft extending pulling element 118 having a transverse hole 120 at its forward end. At its rear end, the pulling element 118 has a pair of laterally offset converging discs 122 and 124, each of which is rotatable about its own transverse axis. The discs 122 and 124 are slightly offset from one another in a fore-and-aft direction as illustrated in FIGS. 4 and 5, are concavo-convex, are disposed with their convex surfaces facing inwardly toward one another, and are arranged to
converge rearwardly toward one another and toward the centerline to the planter so as to urge soil inwardly into the centrally located seed receiving trench formed by the opener 34.

The covering assembly 116 further includes a generally upwardly and rearwardly extending, depth controlling shank 126 connected at its lower end to the pulling element 118 via a transverse connecting pin 128. The shank 126 has a circular seat 130 spaced a short distance above the pulling element 118 upon which rests a coil spring 132 that encircles the remaining upper length of the shank 126. At its uppermost end, the shank 126 is provided with a collar 134.

In order to adapt the planter 10 to receive the covering assembly 116, a pair of adapter brackets are provided, namely, a front adapter bracket 136 and a rear adapter bracket 138. The front adapter bracket 136 attaches to the housing 38 of the opener 34, while the rear adapter bracket 138 attaches to the frame 26 generally above the covering assembly 116.

As shown particularly in FIGS. 2, 3, and 8, the front adapter bracket 136 is generally transversely U-shaped, having a pair of laterally spaced apart sidewalls 140 and 142 which are integrally interconnected at their normally forward extremities by a transverse bight 144. The bight 144 has a flat forwardly facing surface 144a that butts directly against a correspondingly flat, rearwardly facing surface 38a on the opener housing 38. A pair of apertures 146 in the bight 144 receive threaded fasteners 148 that securely affix the bracket 136 to the housing 38. A pair of transversely aligned openings 150 in the sidewalls 140 and 142 of the bracket 136 provide for the reception of a pivot bolt 152 spanning the two sidewalls 140 and 142. When the pulling element 118 of the assembly 116 is inserted between the sidewalls 140, 142, the bolt 152 may be passed through the openings 150 in the sidewalls 140,142 and the hole 120 in the front end of the pulling element 118 so as to swingably couple the pulling element 118 with the front bracket 136.

The rear adapter bracket 138 includes a pair of laterally spaced apart, fore-and-aft extending rigid straps 154 and 156 that lie against the interior surfaces of the respective side members 94 and 96 in parallel relationship therewith. Each of the straps 154,156 is provided with a number of apertures therethrough such as the apertures 158 illustrated in FIG. 6 and also in FIG. 4. In turn, the apertures 158 receive threaded fasteners 160 to rigidly affix the straps 154 and 156 to their respective side members 94 and 96.

The rear bracket 138 further includes a transverse bridge 162 which spans the distance between the two straps 154,156 and is welded thereto at its opposite ends. The bridge 162 is cocked downwardly and rearwardly about its longitudinal axis so that the generally planar bridge 162 lies at right angles to the upwardly and rearwardly projecting shank 126 of the covering assembly 116. A centrally disposed opening 164 in the bridge 162 telescopically receives the shank 126 with the collar 134 being disposed on the upper side of the bridge 162 and the spring 132 disposed on the lower side of the bridge 162. In this manner, the spring 132 is trapped between the lower seat 130 and the bridge 162 so as to yieldably bias the covering discs 122 and 124 downwardly into ground engagement, while the collar 134 provides an upper limit stop to keep the assembly 116 from swinging downwardly too far when the planter is raised out of the ground during transport.

It will be noted that the driving power to the seed metering mechanism housed within the housing 38 of the opener 34 is derived from the press wheel 112 as it engages the ground and is rotated thereby during forward advancement of the planter. In this respect, a sprocket 166 is affixed to the axle 114 associated with the press wheel 112, such axle 114 rotating with the press wheel 112. The chain 56 which entrains the sprocket 54 associated with the cross shaft 52 for the metering mechanism is also trained about the sprocket 166 such that rotation of the press wheel 112 is transmitted to the front sprocket 54, and thence to the metering mechanism. A number of tensioning sprockets 168,170, and 172 are engaged with the chain 56 at various points along the length thereof.

The planter 10 is also shown as being provided with a chemical box 174 supported by the frame 26 rearwardly of the seed box 40 for containing and metering desired chemicals during planting, if such is preferred by the user.

Embodiment of FIGS. 9-14

The second embodiment of a modified planter in accordance with the principles of the present invention is broadly denoted by the numeral 210 and is similar in many respects to the planter 10 of the first embodiment. However, it will be noted that the opener 212 in the second embodiment is in the nature of an elongated, fore-and-aft extending runner 214 instead of the double disc arrangement of the first embodiment. In addition, the housing 216 above the runner 214 which contains the metering mechanism of the opener 212 has a different shape than the housing 38 of the first embodiment, thus requiring a differently configured front adapter bracket 218 for securing the front end of the covering assembly 220 to the housing 216. It will be understood that the covering assembly 220 is identical to the covering assembly 116 of the first embodiment and that it is the other components of the planter which differ from those in the first embodiment.

As in the first embodiment, the fore-and-aft frame 222 of the planter 210 has a rear extension section 224 to enable placement the press wheel 226 at a more rearwardly spaced position relative to the opener 212 than in the present commercially available construction. The extension bars 228 and 230 of extension section 224 are welded to the respective side members 232 and 234 of frame 222 in axial alignment therewith by weld beads 236 and 238.

With particular reference to FIGS. 11, 12, and 13, it may be seen that the front adapter bracket 218 includes a generally fore-and-aft extending plate 240 having a forward concavely arcuate leading edge 242 that is complementarily shaped with respect to the rear arcuate contour 244 of the housing 216. The front edge 242 butts directly against the rear contour 244 in mating engagement therewith. A generally reversely Z-shaped brace 246 has an inner edge extremity welded securely to one side 240a of the plate 240 so that the brace 246 projects outwardly from side 240a. As a result of the reversely Z-shaped configuration of the brace 246, a main fore-and-aft portion 245a thereof projects forwardly beyond the front edge 242 of the plate 240 and terminates in an outturned flange 246b that flatly engages a rearwardly facing flat surface 248 on an ear that projects outwardly from the housing 216. Aperture means 250 (FIG. 12) in the outturned flange 246b receive threaded fasteners 252 to fixedly secure the brace 246 to the flat, rearwardly facing surface 248 of the housing 216.

The plate 240 has an opposite side 240b facing in the opposite direction from side 240a and abutting against a laterally facing surface 254 on a rearwardly projecting tang of the housing 216. Transverse aperture means 256 in the plate 240 allow the side 240b to be securely affixed to the surface 254 via a plurality of threaded fasteners 258 shown in FIGS. 11 and 12.

The left side 240b of the plate 240 also has a generally U-shaped support 260 rigidly secured thereto and projecting laterally outwardly therefrom so as to space the bight portion 260a of the support 260 in spaced, parallel relationship with the plate 240. The plate 240 and the bight portion 268 are provided with aligned openings 262 and 264 respectively for receiving a transverse pivot bolt 266 (FIG. 11). Thus, when the front end of the pulling element 268 of covering assembly 220 is inserted into the space between bight portion 260a and plate 240, the transverse pivot bolt 266 may be inserted to swingably couple the pulling element 268 with the bracket 218.

The rear adapter bracket 270 used in connection with the second embodiment is almost identical to the rear adapter bracket 138 used with the first embodiment. However, the transverse bridge 272 of bracket 270 is spaced further rearwardly in its rigid side straps 274 and 276 than is the bridge 162 in its side straps 154 and 156. In all other respects, the construction of the rear adapter 270 and its operating relationship to the covering assembly 220 is identical to that of the rear adapter bracket 138.

The Embodiment of FIGS. 15-18

The planter 310 of the third embodiment is more closely similar to the planter of the first embodiment than of the second embodiment inasmuch as the opener 312 is of the double-disc variety as opposed to the runner style of the second embodiment. However, the fore-and-aft extending frame 314 of the planter 310 is more elevated than the frame 26 associated with the first embodiment; thus, the configuration of the rear adapter bracket 316 used in connection with planter 310 differs slightly from the rear adapter bracket 138 in order to compensate for the increased elevation of the frame 314. The front adapter bracket 318 may be identical to the front adapter bracket 136 of the first embodiment.

As with the first two embodiments, the frame 314 of the third embodiment is provided with a rearwardly disposed extension section 320 to place the press wheel 322 further to the rear than in the original factory version of the planter. A pair of extension bars 324 and 326 are axially aligned with the corresponding side members 328 and 330 of the frame 314 and are rigidly secured thereto by weld beads 332 and 334. Thus, the covering assembly 336, which is of identical construction to the covering assemblies 116 and 220 may be utilized in the lengthened space between the press wheel 322 and the opener 312.

As illustrated in particular in FIGS. 16 and 8, the rear adapter bracket 316 has a pair of spaced apart, rigid hanger plates 338 and 340 which depend from respective side members 328 and 330 of the frame 14. Each of the hanger plates 338,340 lies against the inside surface of its corresponding side member 328,330 and is provided with aperture means 342 which receive threaded fasteners 344 for rigidly securing the bracket 316 to the frame 314. A transverse bridge 346 spans the distance between the hanger plates 338,340 at their lower, rear extremities and is rigidly affixed thereto such as by welding. In other constructional and operational respects, the rear bracket 316 is identical to the rear brackets 138 and 270.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. In a modified seed planter having a generally fore-and-aft extending frame with a ground-engageable opener supported below the frame for preparing a trench in the soil as the planter is advanced and for depositing seeds seriatim into the trench during such advancement, a ground-engageable press wheel rotatable about a transverse axis and located behind the opener, means associated with the frame and located forwardly of the opener for use in mounting a pair of fore-and-aft extending, swingable arms on opposite sides of the opener having a pair of covering devices at respective rear ends of the arms generally between the opener and the press wheel for use in converging soil centrally into the trench prior to compaction by the press wheel, the improvement comprising:

- an elongated, fore-and-aft extension section located at the rear of the frame providing the latter with an over all greater length than prior to modification of the planter, said press wheel being supported for rotation about its axis at a modified position spaced rearwardly from the position of the axis prior to modification of the planter and increasing the fore-and-aft distance between the press wheel and the opener compared to the distance existing prior to modification;
- a front adapter bracket attached to the opener and projecting rearwardly therefrom;
- a covering assembly attached to the front adapter bracket in trailing relationship thereto within the enlarged space between the opener and the press wheel for converging the soil centrally into the trench in lieu of using the swingable arms and covering devices of the unmodified planter.
- said covering assembly including an elongated element pivotally attached to the front bracket and extending downwardly and rearwardly therefrom, a pair of soil-converging discs attached to the rear of the element on opposite sides thereof for rotation about respective transverse axes, a shank coupled with the element and projecting upwardly and rearwardly therefrom, a compression spring surrounding the shank and resting against a bottom seat on the shank above the element, and a limit collar at the opposite, upper end of the shank spaced above said seat;
- a rear adapter bracket attached to the frame generally above the covering assembly and having an aperture telescopically receiving said shank,
- said limit collar being disposed above the bracket and engageable with the latter to limit downward swinging of the element and said spring being disposed below the bracket and compressible between the latter and said seat for yieldably urging the element and said soil-converging discs downwardly; and
- a transverse shaft above the opener having a sprocket and chain at the outer end thereof for rotation with the shaft,
- said shaft being provided with a bearing therefor spaced inwardly from said sprocket,
- said bearing being mounted on a rigidifying bracket fixedly secured to said frame for receiving a portion of the loading imparted to said shaft by the chain engaged with said sprocket.

2. In a modified seed planter as claimed in claim 1, said frame including a transverse front member located forwardly of said shaft, a transverse rear member located rearwardly of said shaft, and a fore-and-aft extending side member located laterally spaced from the end of said shaft, said rigidifying bracket including three attachment portions threadably affixed to respective ones of said members.

3. In a modified seed planter as claimed in claim 2, said rigidifying bracket further including an underslung plate below said chain and sprocket of the shaft for shielding the chain and sprocket.

4. A front adapter bracket assembly for use in pivotally attaching a front end of a soil covering assembly to a rear surface of a housing associated with the opener of a seed planter, said bracket assembly comprising:
- a generally transversely U-shaped bracket having a pair of rigid, spaced sidewalls and a bight integrally interconnecting said sidewalls,
- said bight having an exterior surface configured complementarily to said rear surface of the housing for mating engagement between said surfaces when the bracket is installed on the housing,
- said bight further having aperture means passing therethrough;
- a pair of aligned openings in said sidewalls;
- a transverse pivot unit received within said aligned openings and adapted to pivotally engage the front end of said covering assembly when said front end is inserted into a space between said sidewalls for swingably coupling the covering assembly with said bracket; and
- threaded fastener means received within said aperture means in the bight for threadably securing the bracket to the housing.

5. A front adapter bracket assembly for use in pivotally attaching a front end of a soil covering assembly to a rear of a seed planter opener housing having an arcuate rear contour, a flat laterally facing surface projecting rearwardly from said counter, and a flat, rearwardly facing surface disposed forwardly adjacent said contour, said bracket assembly comprising:
- a normally fore-and-aft extending plate having an arcuate forward edge adapted to matingly engage with said rear contour of the housing;
- a generally Z-shaped brace having an end extremity fixed to one side of said plate in such a disposition that the brace projects outwardly and thence forwardly from said one side of the plate,
- said brace terminating at its opposite end extremity in a flat, outturned flange adapted to abuttingly engage said rearwadly facing surface of the opener housing,
- means for defining a first aperture in said flange of the brace;
- first fastener means in said first aperture for threadably securing said flange to said rearwardly facing surface of the opener housing;
- means for defining a second aperture in said plate;
- second fastener means in said second aperture for threadably securing said plate to said laterally facing surface of the opener housing;
- a generally U-shaped support rigidly affixed to and projecting outwardly from the other side of said plate and including a rigid bight spaced outwardly from said other side of the plate;
- a pair of aligned openings in the plate and said bight of the support; and
- a transverse pivot unit received within said aligned openings and adapted to pivotally engage the front end of said covering assembly when said front end is inserted into the space between said bight and said other side of the plate for swingably coupling the covering assembly with said plate.

6. A rear adapter bracket assembly for use in coupling a depth control shank of a soil covering assembly to the overhead frame of a seed planter in which said frame includes a pair of laterally spaced apart, fore-and-aft extending side members and the depth control shank has a limit collar on its uppermost rear end and a compression spring located between the collar and a lower seat on the shank, said rear adapter bracket assembly comprising:

a pair of rigid, normally fore-and-aft extending straps spaced apart a distance corresponding generally to the distance between the side members of the frame;

means for defining an aperture in each of said straps;

fastener means in the apertures of said straps for threadably securing the straps to respective side members of the frame;

an elongated, transversely extending bridge spanning the distance between said straps and rigidly affixed thereto at its opposite ends, said bridge being slightly inclined rearwardly; and a central opening in said bridge for telescopically receiving said shank of the covering assembly with the collar disposed above the bridge and the spring disposed below the bridge.

7. A rear adapter bracket assembly for use in coupling a depth control shank of a soil covering assembly to the overhead frame of a seed planter in which said frame includes a pair of laterally spaced apart, fore-and-aft extending side members and the depth control shank has a limit collar on its uppermost rear end and a compression spring located between the collar and a lower seat on the shank, said rear adapter bracket assembly comprising:

a pair of rigid hanger plates spaced apart a distance corresponding generally to the distance between the side members of the frame;

means for defining an aperture in each of said hanger plates;

fastener means in the apertures of said hanger plates for threadably securing the hanger plates to respective side members of the frame;

an elongated, transversely extending bridge spanning the distance between said hanger plates at their lower extremities and rigidly affixed thereto, said bridge being slightly inclined rearwardly; and a central opening in said bridge for telescopically receiving said shank of the covering assembly with the collar disposed above the bridge and the spring disposed below the bridge.

* * * * *